United States Patent
Jacobs et al.

(10) Patent No.: US 10,160,183 B2
(45) Date of Patent: Dec. 25, 2018

(54) COVER FOR A THREE-DIMENSIONAL PRINTER BUILD SURFACE

(71) Applicant: Ideal Jacobs Corporation, Maplewood, NJ (US)

(72) Inventors: Andrew C. Jacobs, Short Hills, NJ (US); Michael T. Valentine, Freehold, NJ (US)

(73) Assignee: Ideal Jacobs Corporation, Maplewood, NJ (US)

( * ) Notice: Subject to any disclaimer, the term of this patent is extended or adjusted under 35 U.S.C. 154(b) by 0 days.

(21) Appl. No.: 16/006,689

(22) Filed: Jun. 12, 2018

(65) Prior Publication Data

US 2018/0290429 A1   Oct. 11, 2018

Related U.S. Application Data

(63) Continuation of application No. 14/271,984, filed on May 7, 2014, now Pat. No. 9,993,995.

(60) Provisional application No. 61/859,774, filed on Jul. 30, 2013.

(51) Int. Cl.
*B29C 33/68* (2006.01)
*B29C 64/245* (2017.01)
(Continued)

(52) U.S. Cl.
CPC .............. *B32B 7/12* (2013.01); *B29C 33/38* (2013.01); *B29C 64/20* (2017.08); *B29C 64/245* (2017.08);
(Continued)

(58) Field of Classification Search
CPC ........ B29C 64/40; B29C 64/20; B29C 64/245; B29C 33/38; B29D 7/01; B33Y 30/00;
(Continued)

(56) References Cited

U.S. PATENT DOCUMENTS

| | | | | |
|---|---|---|---|---|
| 4,273,827 A | * | 6/1981 | Sweeney | B60R 13/02 |
| | | | | 156/306.6 |
| 2006/0249884 A1 | * | 11/2006 | Partanen | B33Y 10/00 |
| | | | | 264/401 |

(Continued)

FOREIGN PATENT DOCUMENTS

| | | | | | |
|---|---|---|---|---|---|
| CN | 101117064 A | * | 2/2008 | | B41M 5/42 |
| CN | 102741371 A | * | 10/2012 | | C09J 7/26 |

(Continued)

OTHER PUBLICATIONS

"How to Succeed When Printing in PLA", by MatterHackers, May 17, 2013, http://www.matterhackers.com/articles/how-to-succeed-when-printing-in-pla, retrievied Jan. 1, 2016. (Year: 2013).*

(Continued)

*Primary Examiner* — Patricia L. Nordmeyer
(74) *Attorney, Agent, or Firm* — Kelley Drye & Warren LLP

(57) ABSTRACT

A cover for a print bed for a three-dimensional object, and methods of manufacturing the same, are disclosed. The cover may include a polycarbonate substrate having a selectively textured upper surface and a double coated adhesive layer provided to adhere the polycarbonate substrate to a print bed.

14 Claims, 1 Drawing Sheet

(51) Int. Cl.
  *B29C 33/38* (2006.01)
  *B29C 67/00* (2017.01)
  *B29C 64/40* (2017.01)
  *B33Y 30/00* (2015.01)
  *B32B 7/12* (2006.01)
  *B29D 7/01* (2006.01)
  *B29C 64/20* (2017.01)
  *B29K 69/00* (2006.01)

(52) U.S. Cl.
  CPC ............. *B29C 64/40* (2017.08); *B29D 7/01* (2013.01); *B33Y 30/00* (2014.12); *B29K 2069/00* (2013.01); *Y10T 156/10* (2015.01); *Y10T 428/1471* (2015.01); *Y10T 428/28* (2015.01); *Y10T 428/2848* (2015.01)

(58) Field of Classification Search
  CPC . B32B 7/12; B29K 2069/00; Y10T 428/1471; Y10T 428/14; Y10T 428/28; Y10T 428/2848; Y10T 156/10
  See application file for complete search history.

(56) References Cited

U.S. PATENT DOCUMENTS

| 2008/0026940 A1* | 1/2008 | Jung | B41M 5/42 503/227 |
| 2012/0242744 A1* | 9/2012 | Sutton | B41J 11/0065 347/31 |
| 2012/0255677 A1* | 10/2012 | Kigami | C09J 7/26 156/329 |

FOREIGN PATENT DOCUMENTS

| WO | WO-2004050323 A1 * | 6/2004 | ............ B29C 41/02 |
| WO | WO-2013018945 A1 * | 2/2013 | ........... G02B 3/0031 |

OTHER PUBLICATIONS

Sabic Lexan, Valox, Valox and Ultem Films Technical Manual, 2009. (Year: 2009).*
Office Action Issued by State Intellectual Property Office in China, dated Feb. 22, 2017. (Year: 2017).*

* cited by examiner

COVER FOR A THREE-DIMENSIONAL PRINTER BUILD SURFACE

CROSS REFERENCE TO RELATED APPLICATIONS

This application relates to, and claims the benefit of the earlier filing date and priority of U.S. patent application Ser. No. 14/271,984, filed on May 7, 2014, which claims the benefit of U.S. Provisional Patent Application No. 61/859,774, filed on Jul. 30, 2013, entitled "An Optimal Build Surface Cover for 3D Printers."

FIELD OF THE INVENTION

The present invention relates generally to a cover adapted to be provided on the build surface or bed of a three-dimensional (3-D) object printing device and methods of manufacturing and using the same.

BACKGROUND OF THE INVENTION

Three-dimensional (3-D) object printers, such as those which employ Fusion Deposition Modeling (FDM), are known. The printing process for such a device involves the deposition of printing material onto a printing platform, also referred to as a print bed. The deposited material may be melted into a pliable state, extruded through a heated nozzle and built up, layer by layer, until the final result is a 3-D object. Because the layers are deposited in sequence on top of each other, print success and quality depend upon the ability to maintain registration of the object with the extruder nozzle throughout the duration of the print job to ensure that each stacked layer registers with the previous one.

Print success and quality may also depend upon adequate adhesion between the printed object and the print bed. Sometimes the first few layers of the printed object do not have sufficient adherence to the print bed, causing the printed object to shift, warp, or delaminate from the print bed, resulting in a failed or poor quality printed object. The print beds for known FDM style 3-D printers are typically made of metal, glass or acrylic. These print beds are not considered consumables, nor are they ideally suited to provide reliable surfaces on which the 3-D printed objects can adhere solidly and consistently. Therefore, it is preferable to pretreat and/or cover the print bed surface of a FDM style 3-D printer prior to printing an object so as to prevent damaging the print bed and to improve the likelihood that the printed object will adhere adequately to the print bed for the duration of the print.

Manufacturers and users of FDM style 3-D printers often require or recommend covering the print bed surface with heat resistant polyimide film or paper masking tape (typically used by painters), and/or pre-treating the surface with hairspray, special water-soluble glue or other liquid treatment solutions. These applications are intended to hold the 3-D printed object to the surface while it is printing and to preserve the longevity of the original print bed. These print bed covering materials are intended to provide a removable and replaceable surface on which to print, and in some cases take the wear and tear that would otherwise be inflicted upon the print bed.

Printer manufacturers may also recommend using a heated print bed for 3-D printing deposit material that requires slower cooling time, such as ABS (acrylonitrile butadiene styrene). Often times the heated print bed is heated to temperature up to 100-130 degrees Celsius. In such cases, the print bed cover material must be able to function while be exposed to the elevated temperature of the print bed. Accordingly, heat resistant polyimide films may be used for heated print beds, while paper masking tape cannot. Other types of deposit material, such as PLA (polylactide), are not slow cooling and do not require a heat tolerant covering material, such as paper masking tape. In general these two common alternatives (heat resistant polyimide films and paper masking tapes) cannot be used interchangeably with different deposit materials due to their differing properties and heat resistant limitations. Thus, there is a need for a single type of print bed cover which may be used with both heated and non-heated print beds.

Further, there are number of disadvantages that may arise from using known print bed covers. For example, commonly used heat resistant polyimide films or paper masking tapes may be difficult and tedious to apply or install on the print bed. Polyimide films and paper masking tape generally are supplied on a roll and need to be cut and resized for the print bed on which they are installed. If the width of the supplied roll is not as wide as the print bed, then multiple sheets of the film or tape may need to be applied side by side in order to cover the print bed. However, it is extremely important that the print bed surface be flat and level to the extruder nozzle; i.e., the gap between the extruder nozzle and top surface of the print bed needs to be uniform over the entirety of the print bed. Failure to provide a uniform distance between the extruder and the print bed cover may result in defective print objects and even damage or tearing of the cover if the extruder nozzle contacts it. Therefore, for best 3-D printing results, the films and tapes need to be applied without overlapping seams, folds, creases or air bubbles under or in the covering surface since such irregularities may cause variation of the distance between the extruder nozzle and the print surface. Because the known films and tapes are typically very thin, they are difficult to work with in a manner that avoids overlapping and air bubbles, and are susceptible to unwanted stretching, folding and creasing while being adhered to the print bed.

Another difficulty which arises from using polyimide film or paper masking tape is that they may not provide sufficient adhesion to keep the 3-D printed object from moving or warping upward during the printing process, resulting in a failed or defective printed object. Alternatively, in some instances, polyimide film or paper masking tape provide so much adhesion that upon completion, the 3-D printed object is difficult to remove from the print surface, which can result in damage to the print bed cover or printing device, or even in personal injury. Excessive adhesion may be further complicated by the thinness of the polyimide film and paper masking tape. When adhesion is too great, the film or tape may be damaged when the printed object is removed from it, or when leftover deposited material is scraped off. The foregoing challenges may result in the need for frequent replacement of the polyimide film or paper masking tape.

Water-soluble glue is another known covering material for 3-D printer beds. The use of such glues, however, requires exposing the completed 3-D printed object to water while it is still adhered to the print surface (through various methods) in order to separate the 3-D printed object from the print surface. This water application step can be inefficient since (a) it is an extra step that would not otherwise be required, (b) requires a new application of glue for each printing operation, and (c) may not work in many situations where the original print bed is equipped with an FDM style 3-D printer bed that is not easily removable from the printing device.

Extremely rigid perfboard or FR4 fiberglass (which is typically used to make printed circuit boards) are still other covering materials that are currently used as print surfaces or covers. Such materials may also suffer from removal problems.

SUMMARY OF THE INVENTION

Responsive to the foregoing challenges, Applicant has developed an innovative method of covering a print bed for a three-dimensional object, comprising: providing an adhesive layer over the print bed; and adhering a lower surface of a polycarbonate substrate to the adhesive layer.

Applicant has further developed an innovative method of manufacturing a cover for a print bed for a three-dimensional object, comprising: providing a polycarbonate substrate having an upper surface and a lower surface; and providing an adhesive layer on the polycarbonate substrate lower surface.

Applicant has further developed an innovative cover for a print bed for a three-dimensional object, comprising: a polycarbonate substrate having an upper surface and a lower surface; and an adhesive layer provided on the polycarbonate substrate lower surface.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Figure 1:
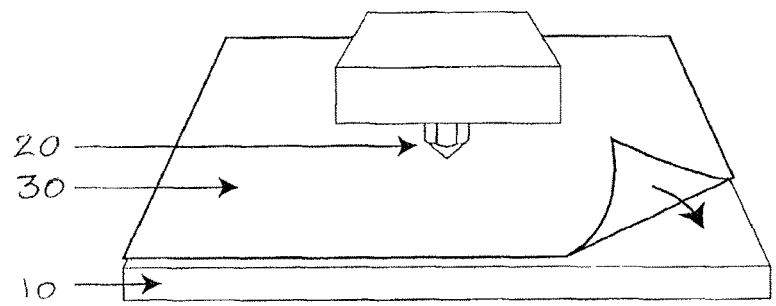
FIG. 1 is a pictorial illustration of a cover having a composition in accordance with an embodiment of the present invention after being applied to a print bed.

In order to assist the understanding of this invention, reference will now be made to the appended drawings, in which like reference characters refer to like elements. The drawings are exemplary only, and should not be construed as limiting the invention.

Figure 2:
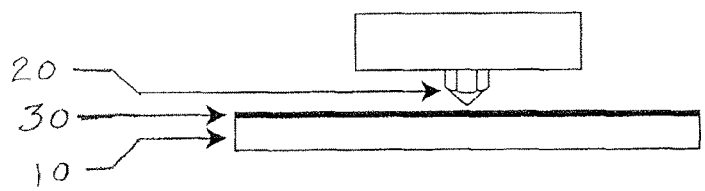
FIG. 2 is a side view of a cover having a composition in accordance with an embodiment of the present invention after being applied to a print bed.

With reference to FIGS. 1 and 2, a 3-D printer having a print bed 10 with which an extruder 20 cooperates, may be provided with a cover 30. The print bed 10 may be heated, for example, if the printer is an FDM style 3-D printer. The cover 30 may be generally planar and sized to cover the working area of the print bed 10.

Figure 3:
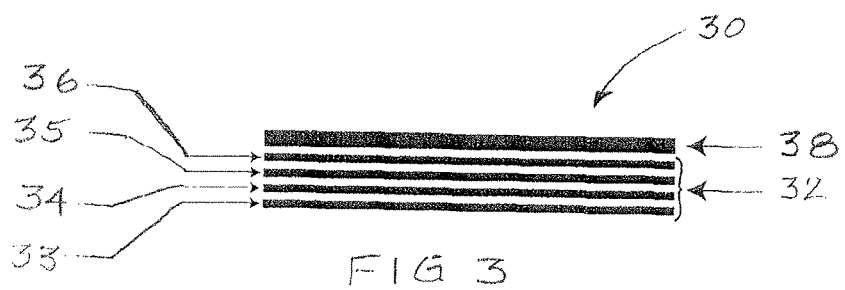
FIG. 3 is a detailed a cross-sectional exploded view of a cover having a composition in accordance with an embodiment of the present invention.

With reference to FIG. 3, the cover 30 may be manufactured by starting with a single surfaced velvet or matte textured polycarbonate substrate 38 which is generally supplied in sheets or rolls. Preferably, the polycarbonate substrate 38 may be in the range of 5 to 10 millimeters in thickness. The thickness of the polycarbonate substrate 38 may be selected such that the substrate is mildly flexible, yet sufficiently rigid to work with. The velvet or matte textured surface of the polycarbonate substrate 38 preferably may have a $R_z3$ roughness of less than 5 microns up to 25 microns based on the ISO 4288 standard. It is appreciated, however, that the velvet or matte textured surface of the polycarbonate substrate 38 could have a roughness outside of the foregoing range without departing from the intended scope of the present invention.

The polycarbonate substrate 38 may be cut down to workable sized press production sheets which are sized appropriately for a print bed 10. Next, in an optional step, the polycarbonate substrate 38 may be sub-surface (reverse side) printed with two-dimensional (2-D) graphics to provide the substrate with customized colors, design layouts, and/or product markings. This optional 2-D printing may be offered when the polycarbonate substrate 38 is clear or at least semi-transparent. Alternatively, the polycarbonate substrate 38 may be supplied in a solid color, such as black, in which case 2-D printing may be omitted.

Next, a double coated adhesive layer 32 may be provided on the lower surface of the polycarbonate substrate 38, i.e., the surface which is not velvet or matte textured. In cases where the cover 30 is intended to be used for FDM style 3-D printing, which requires the use of a heated print bed 10, a heat tolerant or resistant silicone double coated adhesive is preferably used. For example, a heat tolerant double coated adhesive layer 32 may include (1) a PET carrier film 35 having upper and lower surfaces, (2) a first adhesive sub layer 36 having upper and lower surfaces and provided between the PET carrier film 35 upper surface and the polycarbonate substrate 38 lower surface, (3) a second adhesive sub layer 34 having upper and lower surfaces and provided on the PET carrier film 35 lower surface, and (4) a PET protective liner 33 provided on the second adhesive sub layer 34 lower surface. Alternatively, when the cover 30 is not intended to be used with a heated print bed 10, a double coated adhesive that is comparable in tack and removability can be substituted.

The double coated adhesive layer 32 may be supplied on a roll and laminated to the polycarbonate substrate 38 by adhering the first adhesive sub layer 36 to the lower (non-velvet or non-matte) surface of the polycarbonate substrate. After the lamination step, which results in the PET protective liner 33 being distill from the polycarbonate substrate 38, the PET protective liner may be removed to enable a user to adhere the second adhesive sub layer 34 of the cover 30 to the print bed 10. Thus, the PET protective liner 33 protects the integrity of the second adhesive sub layer 34 until the cover 30 is applied to the print bed. The final step in manufacture of the cover 30 may be to die cut the production press sheet (now consisting of the printed or non-printed polycarbonate substrate 38 and double coated adhesive layer 32.

As will be understood by those skilled in the art, the invention may be embodied in other specific forms without departing from the spirit or essential characteristics thereof. For example, the particular architecture depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. In addition, the present invention may be implemented as a method, process, user interface, computer program product, system, apparatus, or any combination thereof. Accordingly, the disclosure of the present invention is intended to be illustrative, but not limiting, of the scope of the invention. It is intended that the present invention cover all such modifications and variations of the invention, provided they come within the scope of the appended claims and their equivalents.

The invention claimed is:

1. A print bed cover for a print bed of a three-dimensional object printer, comprising:
    a sheet of polycarbonate substrate having a flat lower surface and a flat upper surface;
    a double coated adhesive layer having an upper surface and a lower surface, wherein said upper surface is adhered to the lower surface of the sheet of polycarbonate substrate; and
    a PET liner adhered to the double coated adhesive layer lower surface;
    wherein the upper surface of the sheet of polycarbonate substrate has a Velvet texture and an $R_z3$ roughness of up to 25 microns.

2. The print bed cover of claim 1, wherein the sheet of polycarbonate substrate has a lower non-Velvet and non-matte textured surface.

3. The print bed cover of claim 2, wherein the upper surface of the sheet of polycarbonate substrate has an $R_z3$ roughness of less than 5 microns.

4. The print bed cover of claim 1, wherein the double coated adhesive layer comprises:
    a PET carrier film having an upper surface and a lower surface;
    a first adhesive sub layer having an upper and lower surface, said first adhesive sub layer provided between the PET carrier film upper surface and the polycarbonate substrate lower surface; and
    a second adhesive sub layer having an upper and lower surface, said second adhesive sub layer provided on the PET carrier film lower surface.

5. The print bed cover of claim 4, wherein the sheet of polycarbonate substrate has a lower non-Velvet and non-matte textured surface.

6. A three-dimensional object printer, comprising:
    an extruder nozzle;
    a print bed comprising a flat upper surface;
    a double coated adhesive layer adhered to the print bed upper surface; and
    a sheet of polycarbonate substrate having a lower surface and an upper surface, wherein the upper surface has an $R_z3$ roughness of up to 25 microns and is flat and level to the extruder nozzle, and said lower surface is adhered to an upper surface of the double coated adhesive layer.

7. The three-dimensional object printer of claim 3, wherein the upper surface of the sheet of polycarbonate substrate has a Velvet texture.

8. The three-dimensional object printer of claim 7, wherein the sheet of polycarbonate substrate has a lower non-Velvet and non-matte textured surface.

9. The three-dimensional object printer of claim 7, wherein the upper surface of the sheet of polycarbonate substrate has an $R_z3$ roughness of less than 5 microns.

10. The three-dimensional object printer of claim 9, wherein the sheet of polycarbonate substrate has a lower non-Velvet and non-matte textured surface.

11. The three-dimensional object printer of claim 6, wherein the sheet of polycarbonate substrate has a lower non-Velvet and non-matte textured surface.

12. The three-dimensional object printer of claim 6, wherein the upper surface of the sheet of polycarbonate substrate has an $R_z3$ roughness of less than 5 microns.

13. The three-dimensional object printer of claim 12, wherein the sheet of polycarbonate substrate has a lower non-Velvet and non-matte textured surface.

14. The three-dimensional object printer of claim 6, wherein the double coated adhesive layer comprises:
    a PET carrier film having an upper surface and a lower surface;
    a first adhesive sub layer having an upper and lower surface, said first adhesive sub layer provided between the PET carrier film upper surface and the polycarbonate substrate lower surface; and
    a second adhesive sub layer having an upper and lower surface, said second adhesive sub layer provided between the PET carrier film lower surface and the print bed upper surface.

* * * * *